United States Patent
Boudreau et al.

(10) Patent No.: US 7,953,026 B2
(45) Date of Patent: May 31, 2011

(54) METHODS AND SYSTEMS FOR PROVIDING RACF CONFIGURATION INFORMATION

(75) Inventors: Alain Boudreau, Le Gardeur (CA); Steven Rochefort, Pointe Claire (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 770 days.

(21) Appl. No.: 11/829,758

(22) Filed: Jul. 27, 2007

(65) Prior Publication Data
US 2009/0028159 A1 Jan. 29, 2009

(51) Int. Cl.
*H04L 12/28* (2006.01)
*H04L 12/66* (2006.01)
*H04J 3/16* (2006.01)
*G06F 15/173* (2006.01)

(52) U.S. Cl. ........ 370/255; 370/352; 370/395; 370/468; 709/226

(58) Field of Classification Search .......... 370/254–468; 455/404–466; 709/203–224, 226–245; 726/1–12
See application file for complete search history.

(56) References Cited

U.S. PATENT DOCUMENTS

| | | | |
|---|---|---|---|
| 7,263,552 B2* | 8/2007 | Govindarajan et al. | 709/224 |
| 7,602,711 B2* | 10/2009 | Liu | 370/230 |
| 7,702,309 B2* | 4/2010 | Faccin et al. | 455/404.2 |
| 2005/0135375 A1* | 6/2005 | Hurtta et al. | 370/395.2 |
| 2005/0149754 A1* | 7/2005 | Rasanen | 713/201 |
| 2006/0245426 A1* | 11/2006 | Rasanen | 370/389 |
| 2007/0053361 A1* | 3/2007 | Chen et al. | 370/392 |
| 2007/0055874 A1* | 3/2007 | Phan-Anh et al. | 713/168 |
| 2007/0070891 A1* | 3/2007 | Zheng | 370/229 |
| 2007/0201513 A1* | 8/2007 | Anderson et al. | 370/468 |
| 2007/0248106 A1* | 10/2007 | Liu | 370/401 |
| 2008/0008195 A1* | 1/2008 | Oberle et al. | 370/401 |
| 2008/0031227 A1* | 2/2008 | Wang | 370/352 |
| 2008/0049648 A1* | 2/2008 | Liu et al. | 370/310 |
| 2008/0232369 A1* | 9/2008 | Belanger et al. | 370/392 |
| 2008/0247379 A1* | 10/2008 | Belanger et al. | 370/351 |
| 2008/0276006 A1* | 11/2008 | Choi | 709/245 |
| 2009/0158387 A1* | 6/2009 | Huang | 726/1 |
| 2010/0027542 A1* | 2/2010 | Huang et al. | 370/390 |
| 2010/0142517 A1* | 6/2010 | Montemurro et al. | 370/352 |
| 2010/0146130 A1* | 6/2010 | Montemurro et al. | 709/228 |

FOREIGN PATENT DOCUMENTS

WO 2008/040212 A1 4/2008

OTHER PUBLICATIONS

"Telecommunications and Internet Converged Services and Protocols for Advanced Networking (TISPAN); NGN Functional Architecture; Network Attachment Sub-System (NASS); ETSI ES 282 004", ETSI Standards, LIS, Sophia Antipolis, Cedex, France, vol. TISPAN, No. V1.1.1, Jun. 1, 2006, XP014037127, (34 pages).
"Telecommunications and Internet Converged Services and Protocols for Advanced Networking (TISPAN); Resource and Admission Control Sub-System (RACS); Functional Architecture; ETSI ES 282 003", ETSI Standards, LIS, Sophia Antipolis, Cedex, France, vol. TISPAN, No. V1.1.1, Jun. 1, 2006, XP014034085, (41 pages).
International Search Report for PCT/IB2008/052935 dated May 18, 2009. (7 pages).

* cited by examiner

*Primary Examiner* — Man Phan
(74) *Attorney, Agent, or Firm* — Ericsson Canada Inc.

(57) ABSTRACT

Methods and systems are described for providing address information for nodes when multiple possibilities exist. For example, in a TISPAN environment the described techniques can be used to transmit address information to an SPDF when it needs to determine which of multiple A-RACFs associated with different IP domains that the SPDF needs to communicate with.

14 Claims, 6 Drawing Sheets

METHODS AND SYSTEMS FOR PROVIDING RACF CONFIGURATION INFORMATION

TECHNICAL FIELD

The present invention relates generally to telecommunications systems and in particular to methods and systems for transferring identification information between nodes.

BACKGROUND

Communication systems continue to grow and evolve. Convergence between different types of communication systems, e.g., Internet Protocol (IP), connection-based voice communications, and the like, is advancing rapidly. Recently the phrase "Next Generation Network" (NGN) has been used to describe various activities associated with this evolution. As defined by the International Telecommunications Union (ITU), an NGN is a packet-based network able to provide services (including telecommunication services), able to make use of multiple broadband, Quality of Service (QoS)-enabled transport technologies and in which service-related functions are independent from underlying transport-related technologies. NGNs will also likely offer unrestricted access by users to different service providers and will support generalized mobility, which in turn will provide for consistent service provision to end users.

Various standardization groups are working on reaching a consensus regarding the technology considerations which will affect NGN design and implementation. For example, Telecoms & Internet converged Services & Protocols for Advanced Networks (TISPAN) is a European Telecommunications Standards Institute (ETSI) standardization group which focuses on convergence of technologies used in the Internet and other fixed networks. Among other things, TISPAN seeks to provide a modular, subsystem-oriented architecture which facilitates the addition of new subsystems over time to cover new demands and service classes. The TISPAN architecture attempts to ensure that network resources, applications, and user equipment are common to all of the various subsystems to provide for enhanced mobility across, for example, administrative boundaries.

Figure 1:
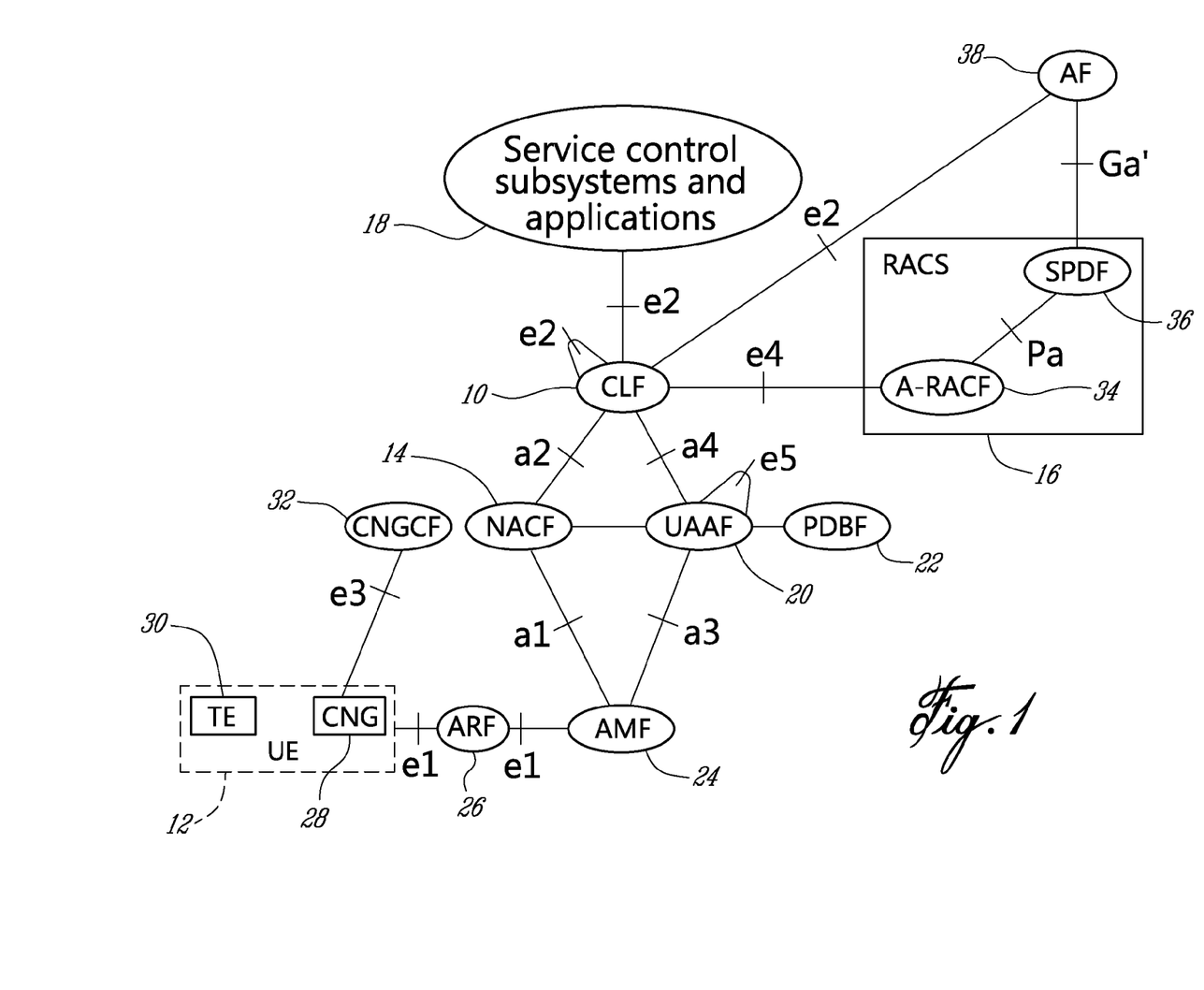
FIG. 1 illustrates a communication system according to exemplary embodiments.

One of the TISPAN subsystems is referred to as the Network Attachment Sub System (NASS). The NASS is responsible for, among other things, handling configuration information, user authentication data, Internet Protocol (IP) address allocation and registering associations between IP addresses allocated to user equipment (UE) and related network location information. An exemplary architecture is illustrated in FIG. 1, which is similar to FIG. 5.1 in the ETSI standards document entitled "Telecommunications and Internet converged Services and Protocols for Advanced Networking (TISPAN); NGN Functional Architecture; Network Attachment Sub-System (NASS)", ETSI ES 282 004 V1.1.1 (2006-06). This exemplary architecture illustrates a NASS and some of the external elements that exchange communications with elements within a NASS. A brief discussion regarding the functional entities shown in FIG. 1 is provided below, however the reader interested in more details is directed to the foregoing standards document. Additionally, in FIG. 1, the links between the various entities represent interfaces. Those interfaces in the NASS which have a lowercase letter and number combination associated therewith (e.g., "e2" and "a3") refer to standardized interfaces discussed in the foregoing standards document. Other interfaces, e.g., Pq and Gq', are used outside of the NASS and are shown where relevant.

For example, the Connectivity Session Location and Repository Function (CLF) 10 operates to, among other things, register the association between the IP address allocated to the UE 12 for a connection and related network location information provided by the Network Access Configuration Function (NACF) 14, such as access transport equipment characteristics, line identifier (Logical Access ID), IP Edge identity, etc. The NACF 14 thus operates to allocate IP address(es) to the UE 12 and may also provide other network configuration parameters, such as the address of DNS server(s) and the address of signaling proxies for specific protocols. The CLF 10 is also in communication with the Resource and Admission Control Subsystem (RACS) 16, other service control subsystems and applications 18, and the User Access Authorization Function (UAAF) 20. The UAAF 20 performs user authentication and authorization checking based on user profiles for network access. The UAAF 20 retrieves authentication data and access authorization information from user network profile information contained in the Profile Database Function (PDBF) 22.

The RACS 16 includes an Access-Resource and Admission Control Function (A-RACF) 34 and a Service-based Policy Decision Function (SPDF) 36. The RACS 16 acts as an interface between the NASS and AF 38 for delivering policy based transport control services, e.g., resource reservation, at a certain time for a specific application. The functional elements within RACS 16 are used to support these policy based transport control services. More specifically, the A-RACF 34 supports admission control and network policy assembly, whereas the SPDF 36 is a logical policy decision element and performs functions, such as, receiving and checking resource request information and insulates the AF 38 from the transport layer. More information regarding RACS 34 can be found in "Telecommunications and Internet converged Services and Protocols for Advanced Networking (TISPAN); Resource and Admission Control Sub-system (RACS); Functional Architecture, ETSI ES 282 003 V1.1.1 (2006-06).

The Access Management Function (AMF) 24 translates network access requests issued by the UE 12 and forwards those requests for allocation of an IP address and, optionally, additional network configuration parameters to/from the NACF 14. The AMF 24 also forwards requests to the UAAF 20 to authenticate the user, authorize or deny network access, and retrieve user-specific access configuration parameters. The NASS architecture further includes an Access Relay Function (ARF) 26 acting as a relay between the Customer Network Gateway (CNG) 28 and the NASS which inserts local configuration information.

As shown in FIG. 1, the UE 12 can be functionally divided into the terminal equipment (TE) 30 itself and the CNG 28. The CNG 28 receives configuration data from the CNG Configuration Function (CNGCF) 32. More specifically, as stated in the above-identified standards document, the CNGCF 32 is used during initialization and update of the CNG 28 to provide the CNG 28 with additional configuration information (e.g. configuration of a firewall internally in the CNG 28, QoS marking of IP packets etc.), which configuration data differs from the network configuration data provided by the NACF 14.

Utilizing the above described elements, an external AF 38 can reserve transport resources from the access network on behalf of a user. One method for performing this process is for the AF 38 to contact the known address of the serving network's CLF 10 over the e2 interface to obtain the address of the specified SPDF 36. The AF 38 then contacts the specified SPDF 36 over the Gq' interface with the user information and the required QoS characteristics for the desired service. The SPDF 36 then contacts the A-RACF 34 to reserve the appropriate resources. A problem with this existing solution occurs when there are multiple A-RACFs 34 with which an SPDF 36 can communicate for serving an access area. In this case the SPDF 36 will not necessarily know which A-RACF 34 to communicate with to support a given request from an AF 38. One possible solution regarding how to identify an appropriate one of the multiple A-RACFs 34, would be to establish static IP address domains for each A-RACF 34. However, this solution may not be optimal due to the lack of flexibility associated with the provision of static IP addresses. Also note that while FIG. 1 does not show multiple A-RACFs 34 with different IP address domains, it is to be understood that there could be multiple A-RACFs 34 with different IP address domains with which the SPDF 36 is in communication with.

However, no efficient mechanism or technique is currently available for enabling an SPDF to determine which of a plurality of A-RACFs serving an access area should be used to handle a given access request.

SUMMARY

Systems and methods according to the present invention address this need and others by providing techniques and devices which facilitate transmitting address information between nodes in a communications network.

According to one exemplary embodiment a network node includes: a processor for receiving configuration information associated with at least one resource management node; and a memory for storing the configuration information; wherein when the processor receives a query from a second node, a response message is transmitted by the processor to the second node, the response message including an address of one of the at least one resource management node.

According to another exemplary embodiment a network node includes: a processor for transmitting a query for address information based upon desired resources; and a memory for storing information received in response to the query; wherein after the processor receives a response to the query, the processor transmits a service request message including an address associated with a resource management node.

According to yet another exemplary embodiment a method for requesting resources by a network node from one of a plurality of resource management nodes includes: transmitting a query message requesting address information based upon desired resources; receiving a response message which includes the address information; and transmitting a service request message including an address associated with a resource management node.

According to yet another exemplary embodiment a method for communicating by a network node includes: receiving configuration information associated with at least one resource management node; storing the configuration information in a memory; and transmitting a response message including an address of one of the at least one resource management node.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 2:
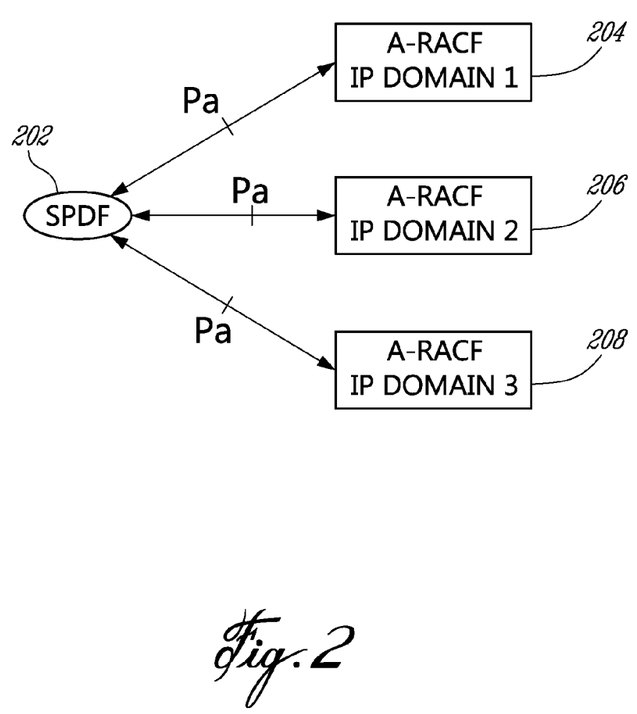
FIG. 2 depicts a Service-based Policy Decision Function (SPDF) with communications connectivity with multiple Access-Resource and Admission Control Functions (A-RACFs) according to exemplary embodiments.

As described above, an exemplary system in which a Network Attachment Subsystem (NASS) communicates with other elements in a communications system is shown in FIG. 1. Elements of this exemplary system shown in FIG. 1 of particular interest in the instant application are the Connectivity session Location and repository Function (CLF) 10, the Resource and Admission Control (RACS) 16 which includes the Access-Resource and Admission Control Function (A-RACF) 34 and the Service-based Policy Decision Function (SPDF) 36, and the Application Function (AF) 38. The communications flows between these elements are depicted by the various standardized interfaces, e.g. e2, e4, Gq' and Pq. As briefly introduced in the Background section, a problem can occur in the communications flow between these elements, when multiple A-RACFs 34 exist for a SPDF 36 to differentiate between. More specifically, as shown in FIG. 2, a SPDF 202 could need to choose between an A-RACF with IP domain_1 204, an A-RACF with IP domain_2 206 and an A-RACF with IP domain_3 208 depending upon which A-RACF is associated with the resources needed to support the subscriber connection requested by the AF 38. Solutions for providing information to the desired node when multiple A-RACF node choices exist will be described in accordance with these exemplary embodiments in more detail below.

According to exemplary embodiments, this problem can be solved for similar situations wherein a node, e.g., an SPDF node, needs to be informed of which one of multiple nodes, e.g., A-RACF nodes, is the correct node for the desired communication. For example, a first node can send a signal to a second node. This signal includes a destination address pointing to the second node and information including the identities (or addresses) of a third node and a fourth node. The second node forwards this signal to the third node, with a destination address pointing to the third node and with information including the identity of the fourth node. The third node then forwards this signal to the fourth node, with a destination address pointing to the fourth node allowing differentiation between multiple destination options for a fourth node. More specific exemplary embodiments utilizing nodes within the TISPAN environment will be described below.

According to another exemplary embodiment, the CLF 10 provides the identity (including address information) of the serving instance of the A-RACF 34 to the AF 38 over the e2 interface as part of the request for SPDF 36 contact information. The CLF 10 knows the correct instance of the A-RACF 34 for the particular subscriber to be served, because this information is based on previous knowledge used to send the subscriber profile information to the correct serving A-RACF 34 over the e4 interface. Thus, the serving A-RACF 34 instance information can be transmitted by the CLF 10 to the AF 38 and then from the AF 38 to the SPDF 36. This allows the SPDF 36 to know which of the multiple A-RACFs to choose from for future communications for this session. An exemplary call flow illustrating this communication process will be described below with respect to FIG. 3.

Figure 3:
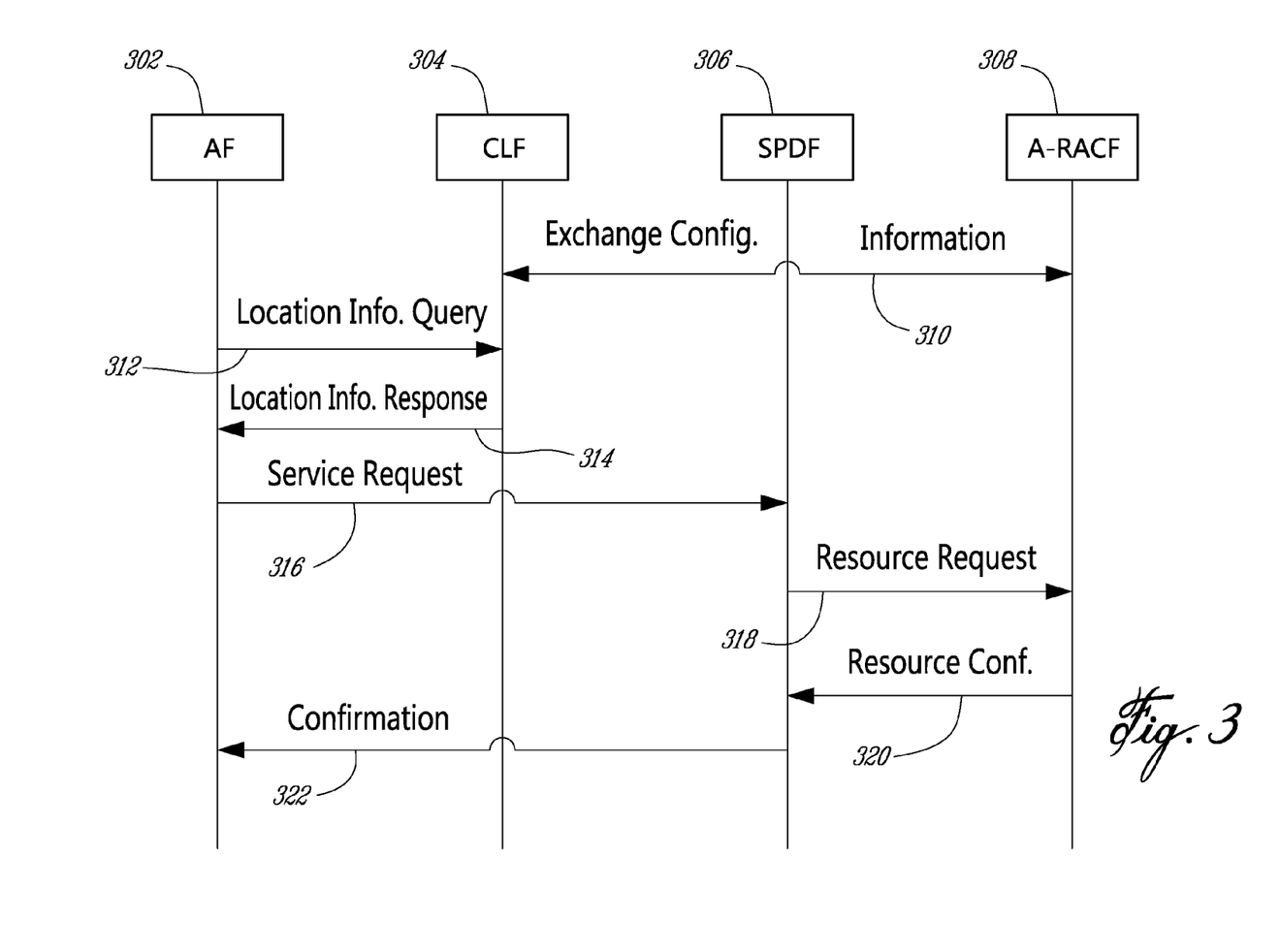
FIG. 3 illustrates a call flow diagram according to exemplary embodiments.

FIG. 3 depicts an exemplary call flow for communicating configuration information between nodes. Initially, the A-RACF 308 exchanges configuration information 310 (also known as an access profile push) with the CLF 304. At some point in time after the CLF 304 and A-RACF 308 have exchanged configuration information 310, the CLF 304 receives a Location Information Query 312 from the AF 302. This Query message 312 includes user identification information. In response to the Location Information Query 312, the CLF 304 transmits a Location Information Response 314, which includes an SPDF 306 identifier and an A-RACF 308 identifier to the AF 302. The AF 302 then transmits a Service Request message 316 which includes an A-RACF 308 identifier to the SPDF 306 identified in the Location Information Response message 314. The SPDF 306 then transmits a Resource Request message 318 which includes desired QoS information to the previously identified A-RACF 308. The A-RACF 308 then transmits a Resource Confirmation message 320 back to the SPDF 306, which then transmits a Confirmation message 322 to the AF 302.

The above described exemplary call flow of FIG. 3 uses a variety of messages that exist within the TISPAN environment. However, certain exemplary messages have been modified to include extra information to enable the above described exemplary embodiments. More specifically, the Location Information Response 314, the Resource Reservation Request, the Resource Modification Request and Resource Release Request messages (shown as message 316) can be modified to include A-RACF 308 identification information. As will be understood by one skilled in the art, these different request messages are shown as a single message 316 from the AF 302 and are sent at different times during the communication process depending upon the state of the session. These messages and their modifications will be described in more detail below.

An exemplary Location Information Response message 314 according to this exemplary embodiment is shown below in Table 1.

TABLE 1

| | |
|---|---|
| Subscriber ID (optional) | The identity of the attached user (see note 1). |
| Location Information (optional) (see note 2) | Location information (or a pointer to such information) in a form that is suitable for the requesting application. |
| RACS contact point (optional) | The FQDN or IP address of the RACS entity where resource request shall be sent i.e. SPDF address. |
| Terminal Type (optional) | The type of terminal equipment. |
| Access Network Type (optional) | The type of access network over which IP connectivity is provided to the user equipment. |
| Serving A-RACF instance (optional) | The FQDN or IP address of the A-RACF entity for the user. | note 1: This identity may be used by the AF when interacting with the RACS.
note 2: Location Information disclosure depends on the requesting application and the subscriber's privacy restrictions. Privacy restrictions are define in the privacy indicator stored in the CLF.

The Location Information Response message 314 is used by the CLF 304 in response to a Location Information Query from the AF 302. As modified according to exemplary embodiments, the Location Information Response message 314 includes information for serving an A-RACF 308 instance, by providing either the fully qualified domain name (FQDN) or IP address of the A-RACF 308 entity for a user as shown above in Table 1. By providing this A-RACF 308 identifying information in this message, the AF 302 can forward the identifying information associated with the desired A-RACF 308 through a Service Request message 316 to the SPDF 306.

Depending upon the stage of a session, e.g., resource reservation, resource modification or resource release, different types of Service Request messages 316 can be transmitted from AF 302 to the SPDF 306. Each of these messages can include information that provides specific identifying information to the SPDF 306 regarding the address of the A-RACF 308 to be used for this session. More specifically, a Resource Reservation Request message according to an exemplary embodiment is shown in Table 2.

TABLE 2

| Resource Req (SPDF -> A-RACF) | |
| --- | --- |
| Application Function Identifier | Global unique Identifier for the application function instance. |
| Resource Reservation Session ID | The reference is a unique resource reservation session identifier in the scope of the Application Function Identifier. |
| Subscriber-ID (optional) | It identifies the subscriber attached to the access network (see note 1). |
| Globally Unique IP Address (optional) | Globally Unique address that corresponds to the UNI associated to the subscriber attached to the network (see note 10). |
| Assigned IP Address | The IP address [lpv4 or lpv6] |
| Address Realm | The addressing domain in which the IP address is significant (see note 2). |
| Requestor Name | Identifies the RACS client requesting the resources (e.g. name of a ASP or group of ASPs). This name corresponds to the Requestor Name in a QoS profile provided by NASS. |
| Service Class | Service class requested by the SPDF. It reflects the service relationship between the A_RACF and SPDF owners. The set of Service Classes that are offered to an SPDF is an administrative matter. |
| Service Priority (optional) | The priority associated to the service request that defines the handling precedence by the receiving entity. |
| Charging Correlation Information (CCI) (optional) | Globally unique identifier for charging correlation purposes. |
| Duration of Reservation (optional) | Duration of the reservation requested by the client. |
| Media Description | The media description. |
| Media Type | The pre-defined type of the media for each flow (e.g. Video). |
| Media Id | Identifier for the specific media. |
| Media Priority (optional) | The priority associated to the media to be used in the admission control process in A-RACF. |
| Traffic Flow Parameters | The traffic flow description of the media. |
| Direction | Direction of the flow. |
| Flow Id | Identifier for the specific flow. |
| IP Addresses | Source and Destination IP addresses [lpv4, lpv6] and Address Realm that each address belongs to (see note 3) |
| Ports | Source and Destination Port Numbers (see note 4). |
| Protocol | Protocol Id (e.g. UDP, MP). |
| Bandwidth | The maximum request bit rate. |
| Reservation Class (optional) | A particular index that identifies a set of traffic characteristics of the flow (e.g. burstiness and packet size). |
| Transport Service Class (optional) | Identifies the forwarding behaviour to be applied to the particular flow (see note 5). |
| Commit Id | Identify if request is to be committed. |
| Serving A-RACF instance (optional) | The FQDN or IP address of the A-RACF entity for the user | note 1: At least one of these two parameters - Subscriber-ID or Global Unique IP address - shall be provided.
note 2: It makes the assigned IP address unique, for example it can be a VPN-id.
note 3: An IP address prefix is supported.
note 4: Port Ranges are supported and can be defined by specifying the minimum and maximum value or by using a wildcard.
note 5: Transport Service Class is also part of QoS profile provided by NASS.

The Resource Reservation Request message, as depicted by Service Request message 316, is used by an AF 302 to request reservation of resources. Additionally, the Resource Reservation Request message is transmitted to the SPDF 306 for future transmission to A-RACF 308 and includes the identifying information of the desired A-RACF 308. This information is provided in the Resource Reservation Request message as shown above in Table 2, which includes information for serving an A-RACF 308 instance, e.g., by providing either the FQDN or IP address of the A-RACF 308 entity for a user.

Another type of Service Request message 316 is the Resource Modification Request message, an example of which is shown in Table 3.

TABLE 3

| Resource Mod (SPDF -> A-RACF) (see note) | |
| --- | --- |
| Application Function Identifier | Global unique Identifier for the application function instance. |
| Resource Reservation Session ID | The reference is a unique resource reservation session identifier in the scope of the Application Function (AF) Identifier. |
| Requester Name | Identifies the RACS client requesting the resources (e.g. name of a ASP or group of ASPs). This name corresponds to the Requester Name in a QoS profile provided by NASS. |
| Service Class | Service class requested by the SPDF. It reflects the service relationship between the A_RACF and SPDF owners. The set of Service Classes that are offered to an SPDF is an administrative matter. |
| Duration of Reservation (optional) | Duration of the reservation requested by the client. |
| Charging Correlation Information (optional) | Globally unique identifier for charging correlation purposes. |

TABLE 3-continued

Resource Mod (SPDF -> A-RACF) (see note)

| | |
|---|---|
| Service Priority (optional) | The priority associated to a service request that defines the handling precedence by the receiving entity. |
| Media Description | The media description. |
| Media Type | The pre-defined type of the media for each flow (e.g. Video). |
| Media Id | Identifier for the specific media. |
| Media Priority (optional) | The priority associated to the media to be used in the admission control process in A-RACF. |
| Traffic Flow Parameters | The traffic flow description of the media. |
| Direction | Direction of the flow. |
| Flow Id | Identifier for the specific flow. |
| IP Addresses | Source and Destination IP addresses [Ipv4, Ipv6] and Address Realm that each address belongs to. |
| Ports | Source and Destination Port Numbers. |
| Protocol | Protocol Id e.g. UDP, TCP. |
| Bandwidth | The maximum request bit rate. |
| Reservation Class (optional) | A the particular index that identifies a set of traffic characteristics of the flow (e.g. burstiness and packet size). |
| Transport Service Class (optional) | Identifies the forwarding behaviour to be applied to the particular flow. |
| Commit Id | Identify if request is to be committed. |
| Serving A-RACF instance (optional) | The FQDN or IP address of the A-RACF entity for the user |

NOTE: Only the Bandwidth inside the Traffic Flow Parameter element can be modified.

Similar to the Resource Reservation Request described above, the Resource Modification Request message, as shown by Service Request 316, is used by an AF 302 to request modification of resources and is transmitted to an SPDF 306 for future transmission to A-RACF 308. Additionally, the identifying information of the desired A-RACF 308 can be included. This information is provided as shown above in Table 3, by providing information for serving an A-RACF 308 instance, by providing either the FQDN or IP address of the A-RACF 308 entity for a user. Note, however, that since the SPDF 306 is stateful, the session ID may be sufficient to enable re-use of the A-RACF identifying information which was received with the initial reservation. Thus, the A-RACF identifier field may also be omitted from the Resource Modification Request message according to other exemplary embodiments.

A third type of Service Request message 316 is the Resource Release Request message, an example of which is shown in Table 4.

TABLE 4

Resource Rel (SPDF-> A-RACF)

| | |
|---|---|
| Application Function Identifier | Global unique Identifier for the application function instance. |
| Resource Reservation Session ID | The reference is a unique session identifier in the scope of the Application Function Identifier (see note). |
| Serving A-RACF instance (optional) | The FQDN or IP address of the A-RACF entity for the user. |

NOTE: The presence of a wildcard in the session part of the reference indicates that all resources identified associated to the Application Function identifier shall be released, otherwise only the specific session is released (it implies all media in the session).

Similar to the Resource Reservation Request message described above, the Resource Release Request message, as depicted by Service Request message 316, is used by the AF 302 to request release of resources. The Resource Reservation Request message is transmitted to the SPDF 306 for future transmission to A-RACF 308 and includes the identifying information for the desired A-RACF 308. This information is provided in the Resource Reservation Request message as shown above in Table 4, by including information for serving an A-RACF 308 instance by providing either the FQDN or IP address of the A-RACF 308 entity for a user. As with the Resource Modification Message, the A-RACF identifying information can alternatively be omitted from the Resource Release Message and instead be re-used by the SPDF 306 based upon the initial reservation information.

Figure 4:
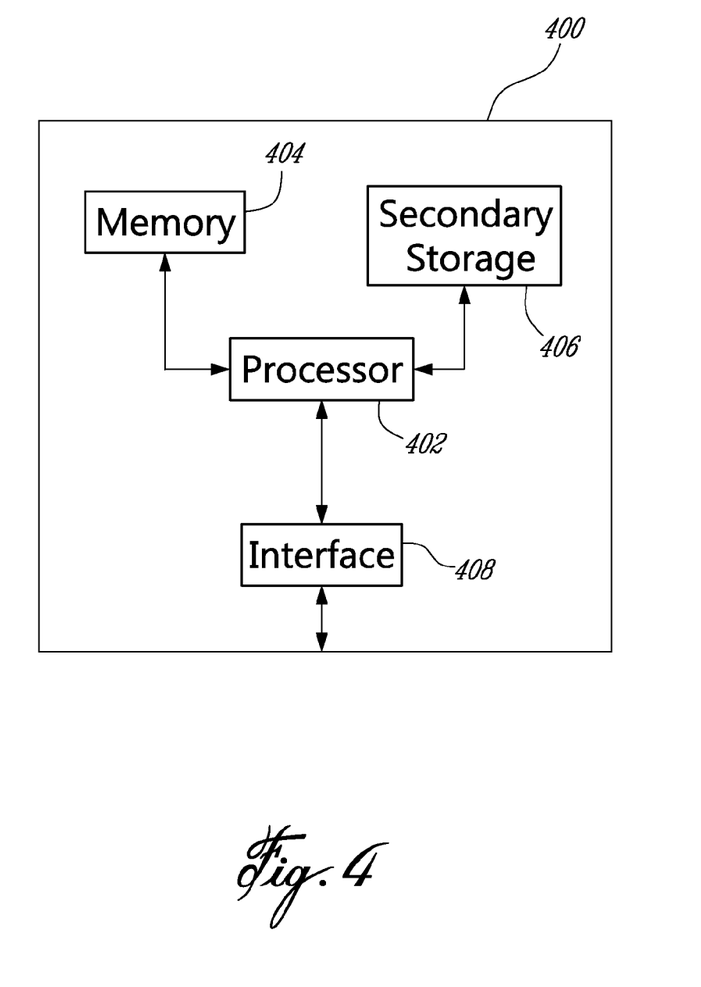
FIG. 4 shows a communications node according to exemplary embodiments.

The exemplary embodiments described above show messages used between nodes in a communication network(s). An exemplary node 400 will now be described with respect to FIG. 4. Server 400 can include a processor 402 (or multiple processor cores), memory 404, one or more secondary storage devices 406 and an interface unit 408 to facilitate communications between network node 400 and the rest of the network. Additionally, the server 400 can also include protocols allowing communications over the potentially different available interfaces through which it may communicate. The memory (or the secondary storage) can be used for storage of exemplary items such as information regarding the hardware/ software devices, including their respective IP addresses or FQDNs and QoS information. Thus, a network node according to an exemplary embodiment may include a processor for transmitting and receiving messages associated with an address for an A-RACF 34.

Figure 5:
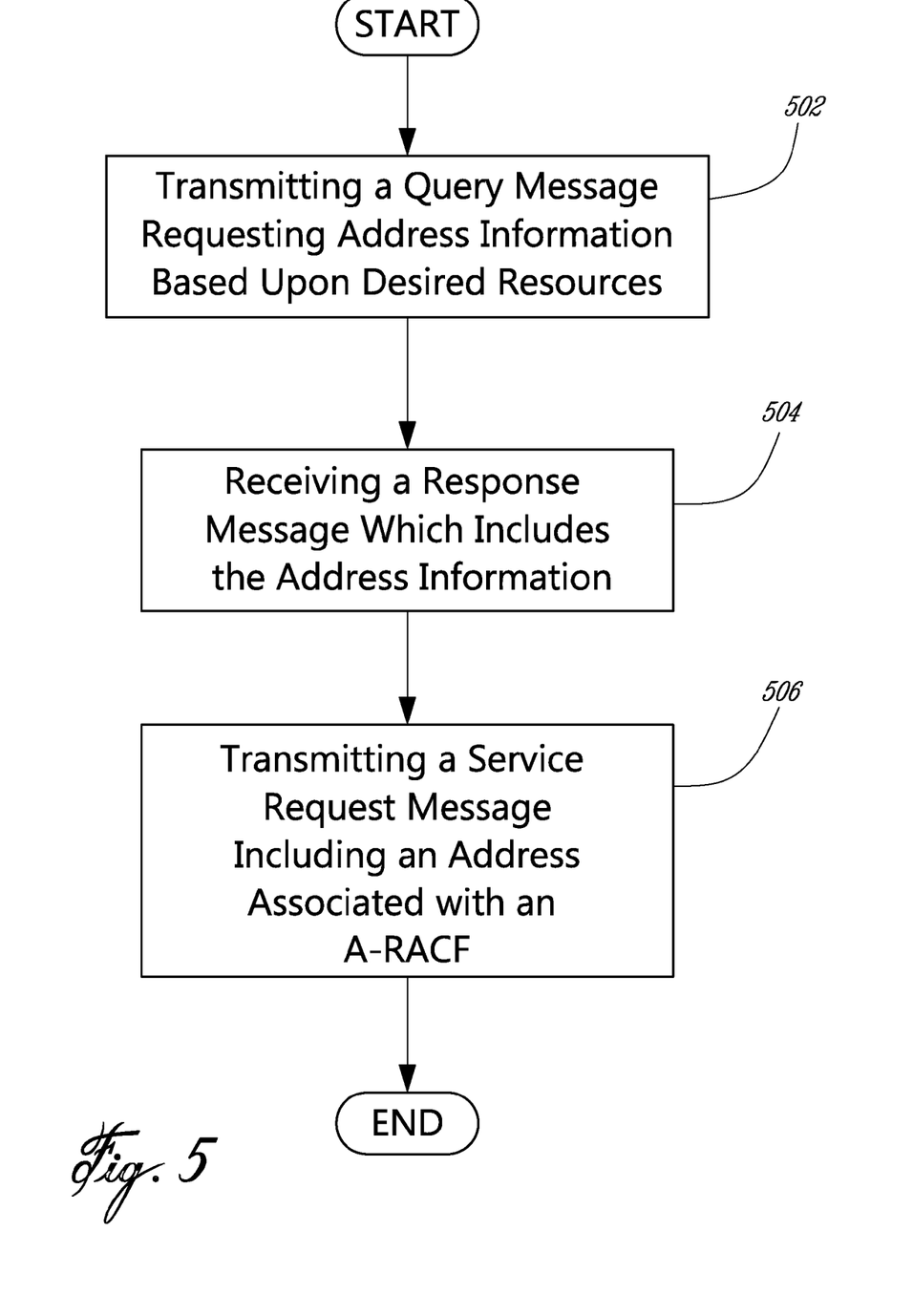
FIG. 5 is a flow chart depicting a communications method according to exemplary embodiments.

Utilizing the above-described exemplary systems according to exemplary embodiments, a method for requesting resources by a network node from multiple A-RACFs is shown in the flowchart of FIG. 5. Initially a network node transmits a query message requesting address information based upon desired resources in step 502. The network node then receives a response message which includes the address information in step 504. Upon receiving the response message, the network node transmits a service request message including an address associated with an Access-Resource and Admission Control Function (A-RACF) in step 506.

Figure 6:
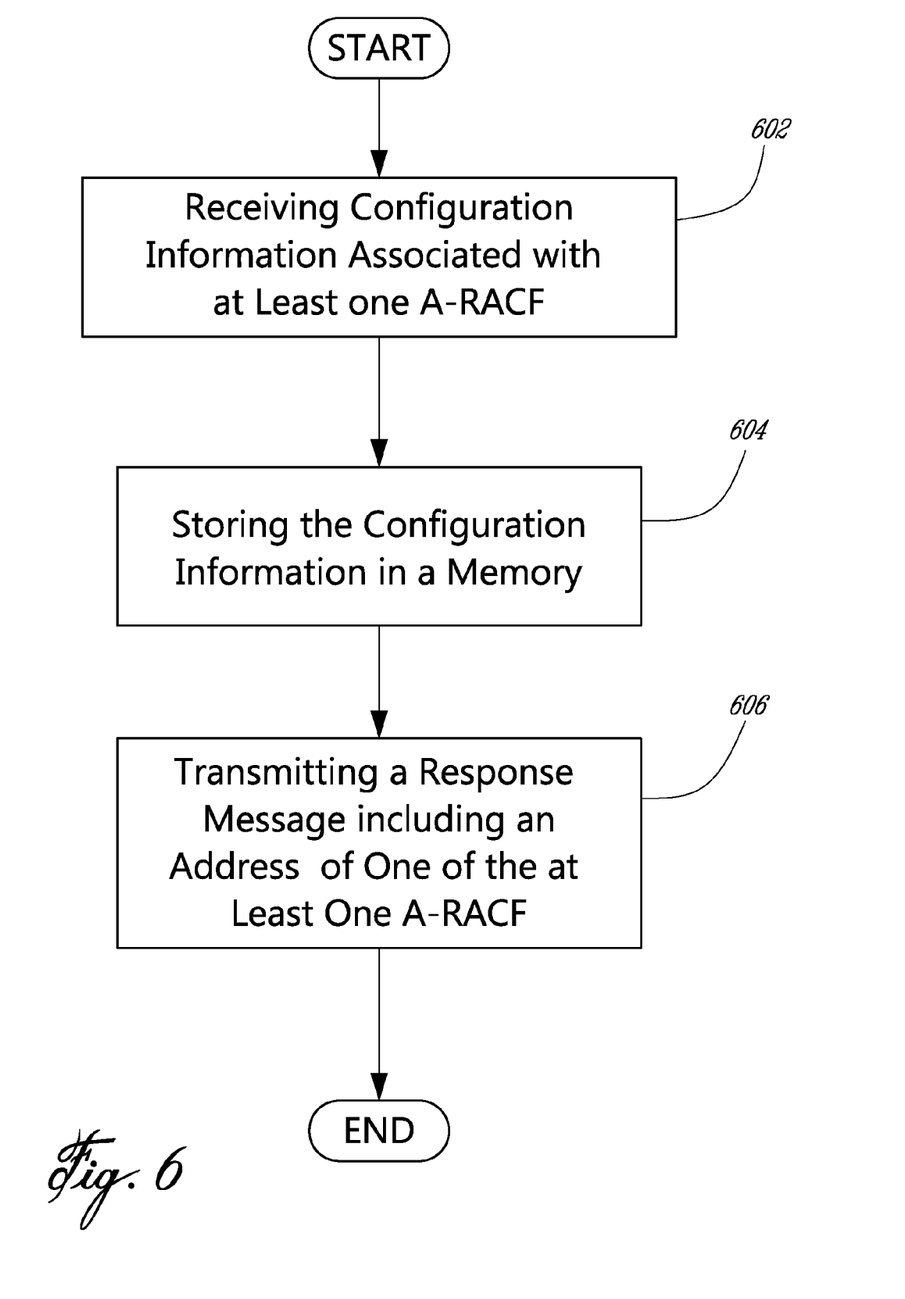
FIG. 6 is a flow chart depicting another communications method according to exemplary embodiments.

Again utilizing the above-described exemplary systems according to exemplary embodiments, a method for communicating configuration information for at least one A-RACF is shown in the flowchart of FIG. 6. Initially a network node receives configuration information associated with at least one A-RACF in step 602. The network node then stores the configuration information in a memory in step 604. After storing the configuration information, the network node transmits a response message including an address of one of the at least one A-RACF in step 606.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A Connectivity session Location and repository Function (CLF) network node comprising:
   a network interface for receiving configuration information from at least one Access-Resource and Admission Control Function (A-RACF) node, for receiving queries from an external Application Function node, and for issuing responses to received queries;
   a memory for storing the received configuration information associated with at least one Access-Resource and Admission Control Function (A-RACF) node, the stored configuration information including a network address associated with the A-RACF, and for storing the address of a Service-based Policy Decision Function (SPDF) associated with the A-RACF; and
   a processor for generating a response to the received query including a network address from the stored configuration information in accordance with the configuration information stored in the memory, and for issuing the generated response through the network interface to the external Application Function node as a response to the received query;
   wherein said response message includes the address of the SPDF associated with the A-RACF that is associated with the configuration information in the response.

2. The CLF network node of claim 1, wherein the received query includes a request for the address of a Service-based Policy Decision Function (SPDF) and one of said at least one A-RACF based upon desired resources.

3. The CLF network node of claim 1, wherein the processor includes means to determine that the request includes user identification information and means to generate the response in accordance with the configuration information stored in the memory and the received user identification information.

4. The CLF network node of claim 1, wherein said address associated with the A-RACF is at least one of an Internet Protocol (IP) address and a fully qualified domain name (FQDN).

5. An Application Function (AF) network node comprising:
   a network interface for issuing queries, receiving responses to the issued queries, issuing service requests and receiving responses to the issued service requests;
   a memory for storing information extracted from the received responses, the information including an address associated with a Serviced-based Policy Decision Function (SPDF) and an address associated with an Access-Resource and Admission Control Function (A-RACF); and
   a processor for generating a query to be issued through the network interface addressed to a Connectivity session Location and repository Function (CLF) requesting the address of a serving A-RACF and an associated SPDF, and for transmitting a service request message specifying an A-RACF;
   wherein said service request message is transmitted towards the SPDF associated with the specified A-RACF.

6. The AF network node of claim 5, wherein said processor includes means to generate the query to include user identification information.

7. The network node of claim 5, wherein said address associated with the A-RACF is at least one of an Internet Protocol (IP) address and a fully qualified domain name (FQDN).

8. A method for requesting resources at an Application Function (AF) network node, the resources requested from one of a plurality of Access-Resource and Admission Control Functions (A-RACFs), the method comprising:
   transmitting a query message to a Connectivity session location and repository Function (CLF) requesting address information associated with an A-RACF based upon desired resources;
   receiving a response message from the CLF, the response including an address associated with the A-RACF; and
   transmitting a service request message specifying the address associated with the A-RACF to a Service-based Policy Decision Function (SPDF) associated the specified A-RACF;
   wherein said the response message from the CLF includes an address associated with an SPDF associated with the specified A-RACF.

9. The method of claim 8, wherein said response message is a Location Information Response message which includes serving A-RACF instance information.

10. The method of claim 8, wherein said service request message includes serving A-RACF instance information and is one of a Resource Reservation Request message, a Resource Modification Request message and a Resource Release Request message.

11. The method of claim 8, wherein said address is at least one of an Internet Protocol (IP) address and a fully qualified domain name (FQDN).

12. A method for communicating at a Connectivity session Location and repository Function (CLF) network node comprising:
   receiving configuration information associated with at least one resource management node the configuration information including address information for an Access-Resource and Admission Control Function (A-RACF);
   storing said configuration information in a memory;
   receiving a query from an Application Function (AF) requesting configuration information stored in the memory
   transmitting a response to the query to the AF including the address of the A-RACF;
   wherein said query includes a request for an address of a Service-based Policy Decision Function (SPDF) associated with the A-RACF; and
   wherein the received configuration information includes the address of an SPDF associated with the A-RACF, and said response to the query includes the address of the SPDF.

13. The method of claim 12, wherein the query includes user identification information, and the response to the query is generated in accordance with the user identification information and the configuration information stored in the memory.

14. The method of claim 12, wherein said address of the A-RACF is at least one of an Internet Protocol (IP) address and a fully qualified domain name (FQDN).

* * * * *